United States Patent
Friedlander et al.

(10) Patent No.: US 9,292,506 B2
(45) Date of Patent: Mar. 22, 2016

(54) DYNAMIC GENERATION OF DEMONSTRATIVE AIDS FOR A MEETING

(71) Applicant: INTERNATIONAL BUSINESS MACHINES CORPORATION, Armonk, NY (US)

(72) Inventors: Robert R. Friedlander, Southbury, CT (US); John D. Hill, III, Herndon, VA (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 13/780,779

(22) Filed: Feb. 28, 2013

(65) Prior Publication Data

US 2014/0244677 A1    Aug. 28, 2014

(51) Int. Cl.
*G06F 17/30* (2006.01)
*G06F 17/22* (2006.01)
*G06F 17/27* (2006.01)
*G06F 17/28* (2006.01)

(52) U.S. Cl.
CPC ...... *G06F 17/30011* (2013.01); *G06F 17/2229* (2013.01); *G06F 17/2785* (2013.01); *G06F 17/2881* (2013.01)

(58) Field of Classification Search
None
See application file for complete search history.

(56) References Cited

U.S. PATENT DOCUMENTS

| | | | |
|---|---|---|---|
| 5,450,535 A | 9/1995 | North | |
| 5,664,179 A | 9/1997 | Tucker | |
| 5,689,620 A | 11/1997 | Kopec et al. | |
| 5,701,460 A | 12/1997 | Kaplan et al. | |
| 5,943,663 A | 8/1999 | Mouradian | |
| 5,974,427 A | 10/1999 | Reiter | |
| 6,199,064 B1 | 3/2001 | Schindler | |

(Continued)

FOREIGN PATENT DOCUMENTS

| | | |
|---|---|---|
| EP | 1566752 A2 | 8/2005 |
| EP | 1843259 A2 | 10/2007 |

(Continued)

OTHER PUBLICATIONS

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

(Continued)

*Primary Examiner* — Etienne Leroux
*Assistant Examiner* — Farhad Agharahimi
(74) *Attorney, Agent, or Firm* — John R. Pivnichny; Law Office of Jim Boice

(57) ABSTRACT

A method, computer program product and/or system generate presentation material for a proposed meeting. Synthetic insights of members of an expected audience at the proposed meeting are generated. The synthetic insights describe a preferred style of communication as indicated by the members of the expected meeting audience during a previous commercial interaction. Information documents from a document database are matched to a topic of the proposed meeting and the synthetic insights of the expected meeting audience, in order to retrieve relevant information documents for the proposed meeting. Presentation material for the proposed meeting is then generated from information documents that match the topic of the proposed meeting and the synthetic insights of the expected meeting audience.

5 Claims, 6 Drawing Sheets

(56) References Cited

U.S. PATENT DOCUMENTS

| | | |
|---|---|---|
| 6,275,833 B1 | 8/2001 | Nakamura et al. |
| 6,314,555 B1 | 11/2001 | Ndumu et al. |
| 6,381,611 B1 | 4/2002 | Roberge et al. |
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,058,628 B1 | 6/2006 | Page |
| 7,103,836 B1 * | 9/2006 | Nakamura et al. ............ 715/207 |
| 7,209,923 B1 | 4/2007 | Cooper |
| 7,337,174 B1 | 2/2008 | Craig |
| 7,441,264 B2 | 10/2008 | Himmel et al. |
| 7,493,253 B1 | 2/2009 | Ceusters et al. |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,620,958 B1 | 12/2013 | Adams et al. |
| 8,799,323 B2 | 8/2014 | Nevin, III |
| 8,849,907 B1 * | 9/2014 | Hession et al. ............... 709/204 |
| 2002/0091677 A1 | 7/2002 | Sridhar |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1 | 8/2003 | Worden |
| 2003/0212851 A1 * | 11/2003 | Drescher et al. ............. 711/100 |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1 | 8/2005 | Benja-Athon |
| 2005/0222890 A1 * | 10/2005 | Cheng et al. .................... 705/9 |
| 2005/0273730 A1 | 12/2005 | Card et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 * | 4/2007 | Donahue ........................ 705/80 |
| 2007/0130182 A1 | 6/2007 | Forney |
| 2007/0136048 A1 | 6/2007 | Richardson-Bunbury et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0159317 A1 | 7/2008 | Iselborn et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |
| 2010/0077033 A1 * | 3/2010 | Lowry ........................... 709/206 |
| 2010/0088322 A1 | 4/2010 | Chowdhury et al. |
| 2010/0131293 A1 | 5/2010 | Linthicum et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |

(56) References Cited

U.S. PATENT DOCUMENTS

| | | |
|---|---|---|
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0173585 A1 | 7/2013 | Friedlander et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0254202 A1 | 9/2013 | Friedlander et al. |
| 2013/0291098 A1 | 10/2013 | Chung et al. |
| 2013/0311473 A1 | 11/2013 | Safovich et al. |
| 2013/0326412 A1 | 12/2013 | Treiser |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1 | 3/2014 | Medelyan et al. |
| 2014/0074892 A1 | 3/2014 | Adams et al. |
| 2014/0081939 A1 | 3/2014 | Adams et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| WO | 2006086179 A2 | 8/2006 |
| WO | 2007044763 A2 | 4/2007 |

OTHER PUBLICATIONS

Evaggelio Pitoura et al., "Context in Databases", University of Ioannina, Greece, 2004, pp. 1-19.
Avinash Kaushik, "End of Dumb Tables in Web Analytics Tools! Hello: Weighted Sort", Sep. 7, 2010, www.kaushik.net, pp. 1-15.
Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.
Visual Paradigm, "DB Visual Architect 4.0 Designer's Guide: Chapter 6—Mapping Object Model to Data Model and Vice Versa", 2007, pp. 6-2-6-26.
"Fraud Detection Using Data Analytics in the Banking Industry," ACL Services Ltd., 2010, pp. 1-9 <http://www.acl.com/pdfs/DP_Fraud_detection_BANKING.pdf>.
W. Caid et al., "Context Vector-Based Text Retrieval", Fair Isaac Corporation, Aug. 2003, pp. 1-20.
K. Matterhorn, "How to Share Data Between a Host Computer & Virtual Machine," Ehow, pp. 1-3, <http://www.ehow.com/how_7385388_share-host-computer-virtual-machine.html>, Retrieved Feb. 17, 2013.
U.S. Appl. No. 13/342,305, Friedlander et al. filed Jan. 3, 2012.
Richard Saling, "How to Give a Great Presentation! From the HP Learning Center", Jul. 28, 2008, <http://rsaling.wordpress.com/2008/07/28/how-to-give-a-great-presentation/>, pp. 1-28.
"Ninth New Collegiate Dictionary", Merriam-Webster Inc., 1991, p. 77 and 242.
"The American Heritage College Dictionary", Fourth Edition, Houghton Mifflin Company, 2004, p. 44 and 262.
U.S. Appl. No. 13/680,832—Non-Final Office Action Mailed Apr. 8, 2014.
U.S. Appl. No. 13/595,356—Non-Final Office Action Mailed Apr. 14, 2014.
U.S. Appl. No. 13/342,406—Notice of Allowance Mailed Mar. 20, 2014.
U.S. Appl. No. 13/628,853—Notice of Allowance Mailed Mar. 4, 2014.
U.S. Appl. No. 13/755,623—Notice of Allowance Mailed May 27, 2014.
S. Alam et al., "Interoperability of Security-Enabled Internet of Things", Springer, Wireless Personal Communications, Dec. 2011, vol. 61, pp. 567-586.
U.S. Appl. No. 13/648,801—Non-Final Office Action Mailed Jul. 1, 2014.
U.S. Appl. No. 13/609,710—Final Office Action Mailed Jul. 24, 2014.
U.S. Appl. No. 13/733,052—Non-Final Office Action mailed Sep. 18, 2014.
U.S. Appl. No. 13/861,058—Non-Final Office Action mailed Dec. 11, 2014.
U.S. Appl. No. 13/342,406—Non-Final Office Action Mailed Sep. 27, 2013.
U.S. Appl. No. 13/610,347—Non-Final Office Action Mailed Jul. 19, 2013.
U.S. Appl. No. 13/610,347—Notice of Allowance Mailed Aug. 19, 2013.
U.S. Appl. No. 13/592,905—Non-Final Office Action Mailed May 8, 2013.
J. Cheng et al., "Context-Aware Object Connection Discovery in Large Graphs", Data Engineering, 2009. ICDE '09. IEEE 25th International Conference on, pp. 856-867.
R. Angles et al., "Survey of Graph Database Models", ACM Computing Surveys, vol. 40, No. 1, Article 1, Feb. 2008, pp. 1-65.
U.S. Appl. No. 13/592,905—Notice of Allowance Mailed Oct. 25, 2013.
M.J. Flynn, et al., "Sparse Distributed Memory Principles of Operation", Research Institute for Advanced Computer Science, 1989, pp. 1-60.
P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.
P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.
M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.
A. Jin, et al., "Biohashing: Two Factor Authentication Featuring Fingerprint Data and Tokenised Random Number," Pattern Recognition 37, Elsevier Ltd., 2004, pp. 2245-2255.
N. Saxena et al., "Data remanence effects on memory-based entropy collection for RFID systems", International Journal of Information Security 10.4 (2011), pp. 213-222.

(56) References Cited

OTHER PUBLICATIONS

A. Birrell et al., "A design for high-performance flash disks." ACM SIGOPS Operating Systems Review 41.2 (2007), pp. 88-93.
U.S. Appl. No. 13/628,853—Non-Final Office Action Mailed Nov. 7, 2013.
U.S. Appl. No. 13/609,710—Non-Final Office Action Mailed Jan. 27, 2014.
U.S. Appl. No. 13/540,295—Non-Final Office Action Mailed Jan. 30, 2014.
U.S. Appl. No. 13/540,230—Non-Final Office Action Mailed Jan. 30, 2014.
U.S. Appl. No. 13/540,267—Non-Final Office Action Mailed Feb. 4, 2014.
U.S. Appl. No. 13/610,523—Non-Final Office Action mailed Apr. 30, 2015.
U.S. Appl. No. 13/540,267—Non-Final Office Action mailed Jun. 4, 2015.
U.S. Appl. No. 13/609,710—Examiner's Answer mailed Jun. 9, 2015.
U.S. Appl. No. 13/896,461—Non-Final Office Action mailed Apr. 21, 2015.
U.S. Appl. No. 13/755,987—Non-Final Office Action mailed Jan. 2, 2015.
U.S. Appl. No. 13/648,801—Final Office Action mailed Jan. 13, 2015.
G. Begelman et al., "Automated Tag Clustering: Improving Search and Exploration in the TagSpace", Collaborative Tagging Workshop, WWW2006, Edinburgh, Scotland, May 2006, pp. 1-29.
U.S. Appl. No. 13/621,931—Non-Final Office Action mailed Jan. 28, 2015.
U.S. Appl. No. 13/732,567—Non-Final Office Action mailed Jan. 30, 2015.
U.S. Appl. No. 14/078,135—Notice of Allowance mailed Feb. 24, 2015.
U.S. Appl. No. 13/756,051—Notice of Allowance mailed Feb. 27, 2015.
U.S. Appl. No. 13/732,567—Non-Final Office Action mailed Mar. 26, 2015.
L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).
S. Ceri et al., "Model-Driven Development of Context-Aware Web Applications", ACM, ACM Transactions on Internet Technology, 2007, (Abstract Only).
U.S. Appl. No. 13/569,366—Non-Final Office Action mailed Jun. 30, 2015.
U.S. Appl. No. 13/648,801 Examiner's Answer Mailed Oct. 1, 2015.

* cited by examiner

DYNAMIC GENERATION OF DEMONSTRATIVE AIDS FOR A MEETING

BACKGROUND

The present disclosure relates to the field of computers, and specifically to the use of computers in managing data. Still more particularly, the present disclosure relates to data that is used in information documents, such as handouts, slide shows, presentation material, and other types of informational documents used in a meeting.

A meeting between a presenter and an audience is typically directed to a specific topic or type of topic. In order to make the meeting more productive, demonstrative aids (presentation materials), such as handouts, pamphlets, slide shows, etc., allow the presenter to give the audience concrete examples of and/or support for a verbal presentation of the presenter. Oftentimes, such demonstrative aids are generic in nature.

SUMMARY

A method, computer program product and/or system generate presentation material for a proposed meeting. Synthetic insights of members of an expected meeting audience at the proposed meeting are generated. The synthetic insights describe a preferred style of communication as indicated by the members of the expected meeting audience during a previous commercial interaction. Information documents from a document database are matched to a topic of the proposed meeting and the synthetic insights of the expected meeting audience, in order to retrieve relevant information documents for the proposed meeting. Presentation material for the proposed meeting is then generated from information documents that match the topic of the proposed meeting and the synthetic insights of the expected meeting audience.

DETAILED DESCRIPTION

Figure 1:
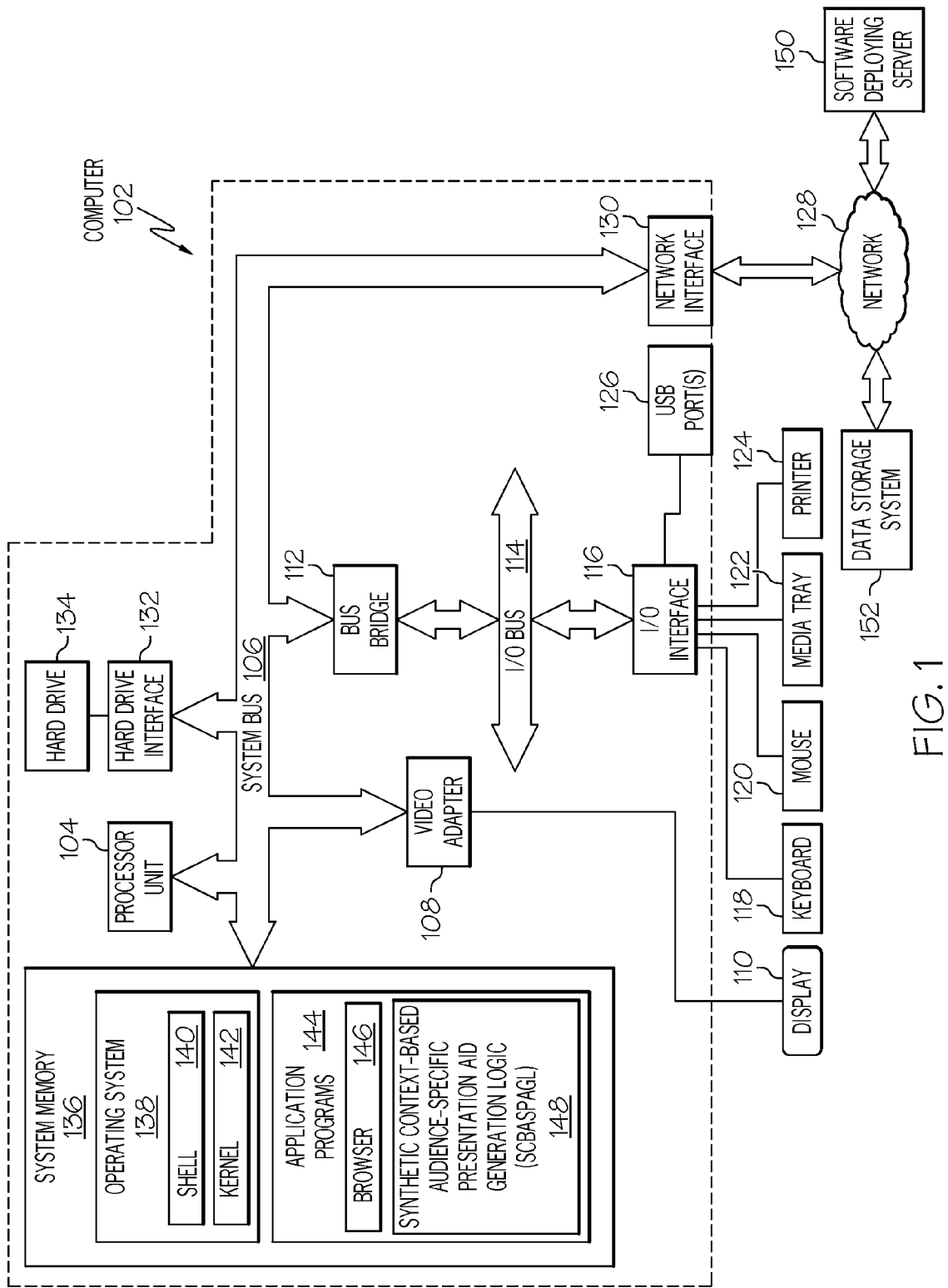
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In one embodiment, instructions are stored on a computer readable storage device (e.g., a CD-ROM), which does not include propagation media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a synthetic context-based audience-specific presentation aid generation logic (SCBASPAGL) 148. SCBASPAGL 148 includes code for implementing the processes described below, including those described in FIGS. 2-6. In one embodiment, computer 102 is able to download SCBASPAGL 148 from software deploying server 150, including in an on-demand basis, wherein the code in SCBASPAGL 148 is not downloaded until needed for execution. Note further that, in one embodiment of the present invention, software deploying server 150 performs all of the functions associated with the present invention (including execution of SCBASPAGL 148), thus freeing computer 102 from having to use its own internal computing resources to execute SCBASPAGL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
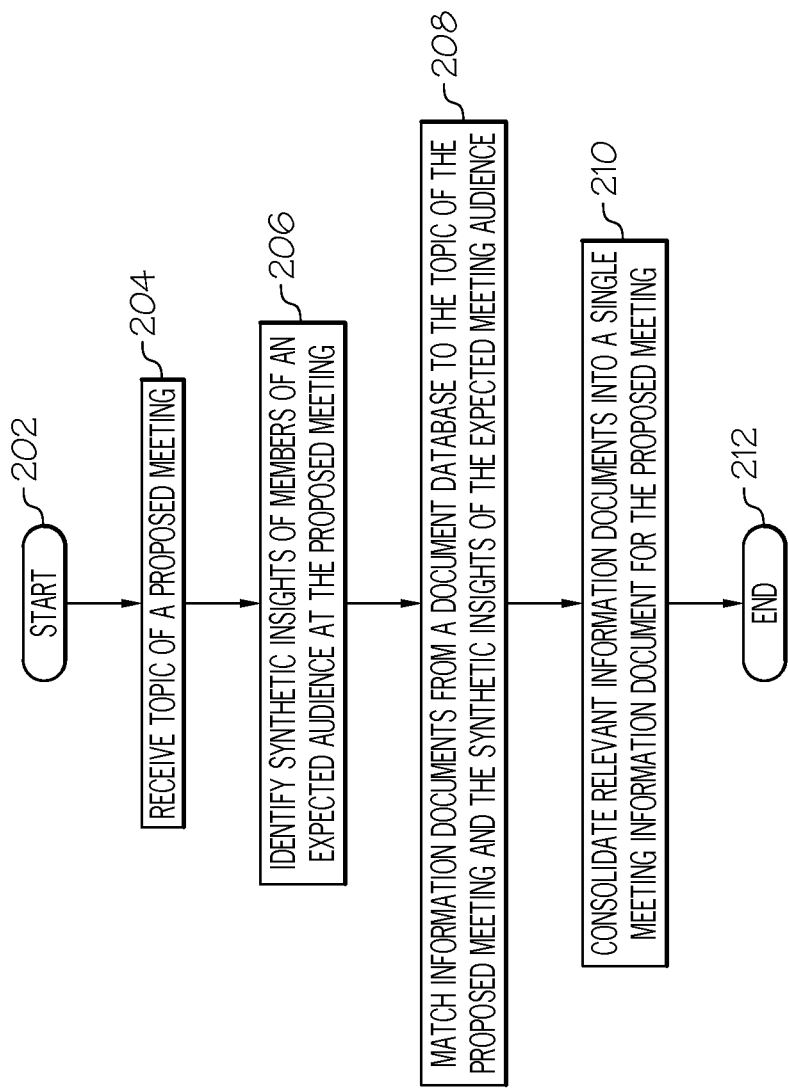
FIG. 2 is a high-level flow-chart of one or more steps performed by one or more processors to generate informational documents for a meeting.

With reference now to FIG. 2, a high-level flow-chart of one or more steps performed by one or more processors to generate informational documents for a proposed meeting is presented. After initiator block 202, a topic for a proposed meeting is received (block 204). This topic may be manually entered by a presenter of the proposed meeting, or it may be generated by context-based logic (e.g., SCBASPAGL 148 shown in FIG. 1) that generates synthetic context-based meeting topic objects, as described in FIG. 4.

Synthetic insights of members of an expected audience at the proposed meeting are then identified, as described in block 206. These synthetic insights describe a preferred style of communication as indicated by the members of the expected meeting audience during a previous commercial interaction, as described in detail below in FIG. 5. The preferred style of communication may be related to the format of presentation materials (i.e., written, visual, musical, etc.); and/or the "tone" of the presentation materials (i.e., humorous, anecdotal, "serious", spontaneous, polished, etc.); and/or the content of the presentation materials (i.e., heavy/light on presentation of math equations, heavy/light on presentation of use cases, heavy/light on presentation of background technical information related to the topic of the meeting, etc.); and/or the length of the presentation materials (i.e., how "long" the presentation materials went on, how much detail led to this length, etc.); etc. That is, the preferred style refers to what format/tone/content/length/etc. best persuaded/informed/inspired/etc. this particular audience or type of audience.

As described in block 208, information documents from a document database are matched to the topic of the proposed meeting and the synthetic insights of the expected meeting audience, wherein said matching retrieves relevant information documents for the proposed meeting, as described in exemplary detail below in FIG. 6. As described in block 210, presentation material for the proposed meeting is generated from the relevant information documents that match the topic of the proposed meeting and the synthetic insights of the expected meeting audience, as also described exemplary detail below in FIG. 6. In one embodiment, the retrieved relevant information documents are consolidated into a single meeting information document. The process ends at terminator block 212.

Figure 3:
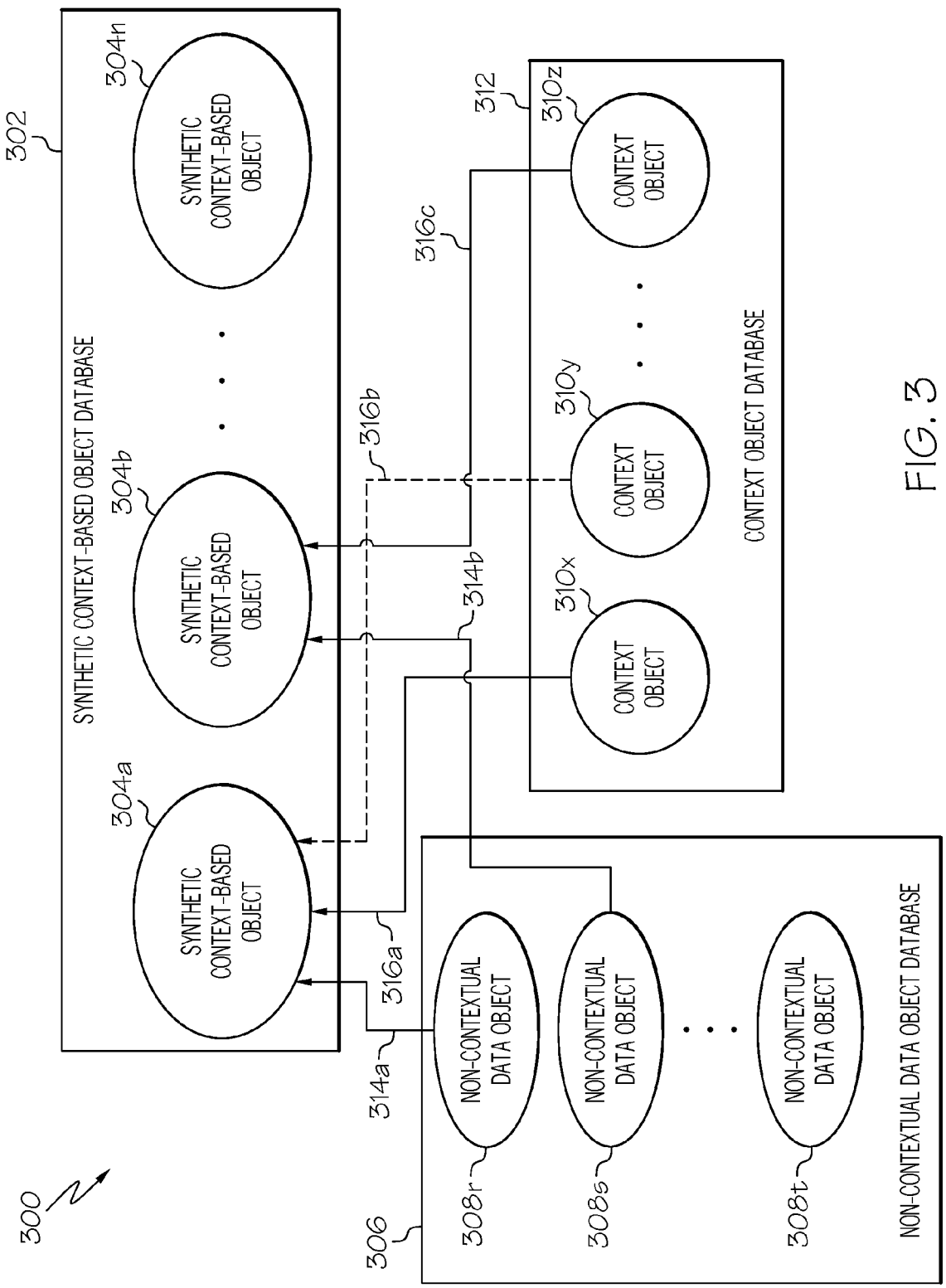
FIG. 3 illustrates a process for generating one or more synthetic context-based objects.

With reference now to FIG. 3, a process for generating one or more synthetic context-based objects in a system 300 is presented. Note that system 300 is a processing and storage logic found in computer 102 and/or data storage system 152 shown in FIG. 1, which process, support, and/or contain the databases, pointers, and objects depicted in FIG. 3.

Within system 300 is a synthetic context-based object database 302, which contains multiple synthetic context-based objects 304a-304n (thus indicating an "n" quantity of objects, where "n" is an integer). Each of the synthetic context-based objects 304a-304n is defined by at least one non-contextual data object and at least one context object. That is, at least one non-contextual data object is associated with at least one context object to define one or more of the synthetic context-based objects 304a-304n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 306 includes multiple non-contextual data objects 308r-308t (thus indicating a "t" quantity of objects, where "t" is an integer). However, data within each of these non-contextual data objects 308r-308t by itself is ambiguous, since it has no context. That is, the data within each of the non-contextual data objects 308r-308t is data that, standing alone, has no meaning, and thus is ambiguous with regards to its subject-matter. In order to give the data within each of the non-contextual data objects 308r-308t meaning, they are given context, which is provided by data contained within one or more of the context objects 310x-310z (thus indicating a "z" quantity of objects, where "z" is an integer) stored within a context object database 312. For example, if a pointer 314a points the non-contextual data object 308r to the synthetic context-based object 304a, while a pointer 316a points the context object 310x to the synthetic context-based object 304a, thus associating the non-contextual data object 308r and the context object 310x with the synthetic context-based object 304a (e.g., storing or otherwise associating the data within the non-contextual data object 308r and the context object 310x in the synthetic context-based object 304a), the data within the non-contextual data object 308r now has been given unambiguous meaning by the data within the context object 310x. This contextual meaning is thus stored within (or otherwise associated with) the synthetic context-based object 304a.

Similarly, if a pointer 314b associates data within the non-contextual data object 308s with the synthetic context-based object 304b, while the pointer 316c associates data within the context object 310z with the synthetic context-based object 304b, then the data within the non-contextual data object 308s is now given meaning by the data in the context object 310z. This contextual meaning is thus stored within (or otherwise associated with) the synthetic context-based object 304b.

Note that more than one context object can give meaning to a particular non-contextual data object. For example, both context object 310x and context object 310y can point to the synthetic context-based object 304a, thus providing compound context meaning to the non-contextual data object 308r shown in FIG. 3. This compound context meaning provides various layers of context to the data in the non-contextual data object 308r.

Note also that while the pointers 314a-314b and 316a-316c are logically shown pointing toward one or more of the synthetic context-based objects 304a-304n, in one embodiment the synthetic context-based objects 304a-304n actually point to the non-contextual data objects 308r-308t and the context objects 310x-310z. That is, in one embodiment the synthetic context-based objects 304a-304n locate the non-contextual data objects 308r-308t and the context objects 310x-310z through the use of the pointers 314a-314b and 316a-316c.

Figure 4:
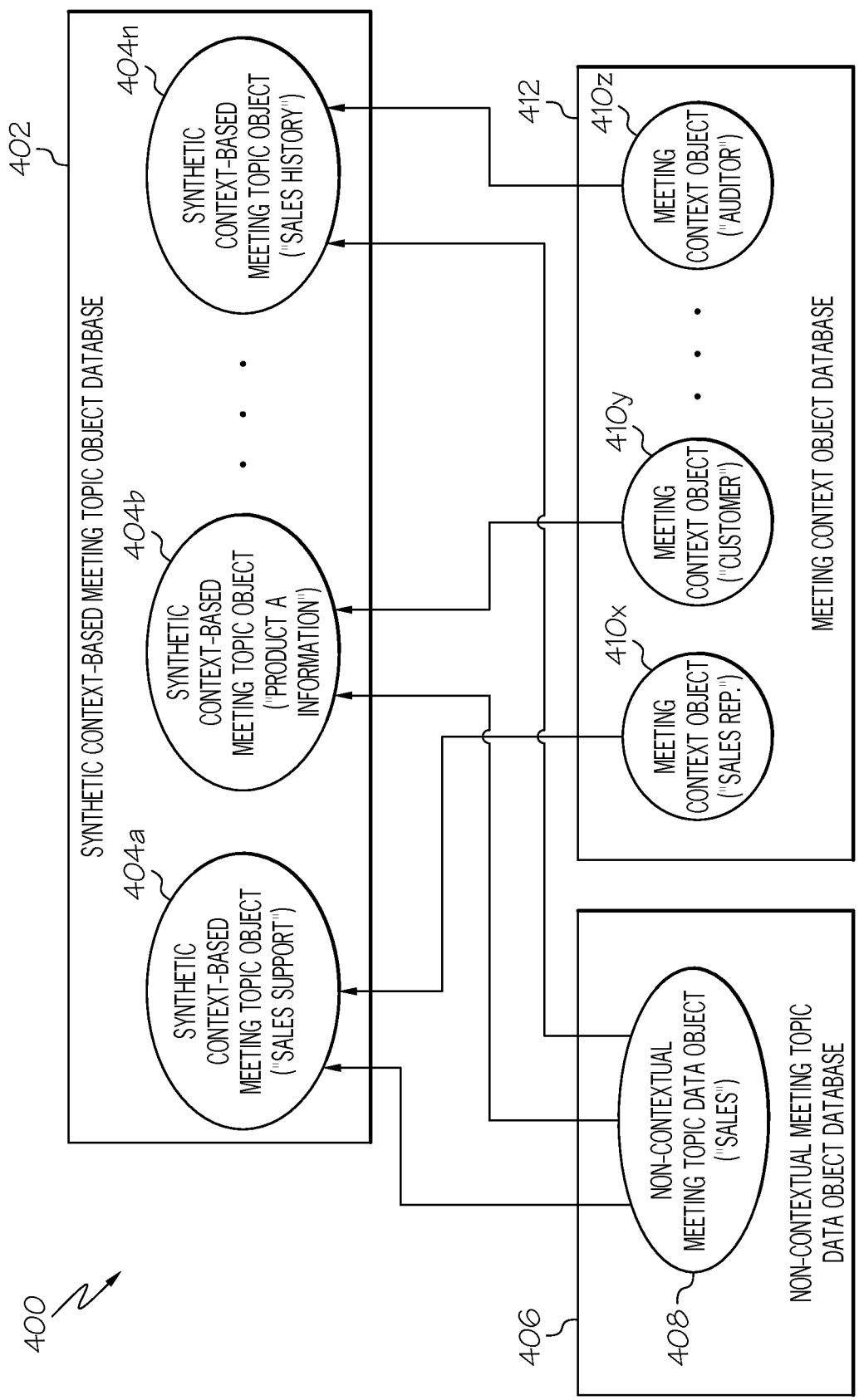
FIG. 4 depicts an exemplary case in which synthetic context-based meeting topic objects are defined for the non-contextual data object datum "Sales"

Consider now an exemplary case depicted in FIG. 4, in which synthetic context-based meeting topic objects are defined for the non-contextual datum object "sales". Standing alone, without any context, the word "sales" is meaningless, since it is ambiguous and does not provide a reference to any particular subject-matter. That is, "sales" may refer to marketing techniques to be used by sales representatives in an enterprise, or it may refer to a transaction with a particular customer, or may refer to enterprise-wide revenue numbers.

In the example shown in FIG. 4, then, data (i.e., the word "sales") from the non-contextual meeting topic data object 408 is associated with (e.g., stored in or associated by a look-up table, etc.) a synthetic context-based meeting topic object 404a, which is devoted to the subject-matter "sales support". The data/word "sales" from non-contextual meeting topic data object 408 is also associated with a synthetic context-based meeting topic object 404b, which is devoted to the subject-matter "Product A information", which is the provision of product information about a "Product A" to customers. Similarly, the data/word "sales" from non-contextual meeting topic data object 408 is also associated with a synthetic context-based meeting topic object 404n, which is devoted to the subject-matter "sales history".

In order to give contextual meaning to the word "sales" (i.e., define the term "sales") in the context of "sales support", meeting context object 410x, which contains the context datum "sales representative", is associated with (e.g., stored in or associated by a look-up table, etc.) the synthetic context-based meeting topic object 404a. Thus, the synthetic context-based meeting topic object 404a defines "sales" as that which is related to the topic of "sale support", such as providing sales representative resources (e.g., information designed to give a sales representative product expertise about a particular product) at the proposed meeting.

Associated with the synthetic context-based meeting topic object 404b is a meeting context object 410y, which provides the context/datum of "customer" to the term "sales" provided by the non-contextual meeting topic data object 408. Thus, the synthetic context-based meeting topic object 404b defines "sales" as that which is related to the subject-matter "product A information", which includes providing technical, pricing, and other information about "Product A" to one or more customers at the proposed meeting.

Associated with the synthetic context-based meeting topic object 404n is a meeting context object 410z, which provides the context/datum of "auditor" to the term "sales" provided by the meeting topic non-contextual data object 408. Thus, the synthetic context-based object 404n defines "sales" as that which is related to the subject-matter "sales history", including records of sales receipts for a particular enterprise, for a particular line of products, etc. to be provided to an auditor at the proposed meeting.

In one embodiment, the data within a non-contextual data object is even more meaningless if it is merely a combination of numbers and/or letters. For example, consider the scenario in which data "10" (not shown) were to be contained within a non-contextual meeting topic data object 408 depicted in FIG. 4. Standing alone, without any context, this number is meaningless, identifying no particular subject-matter, and thus is completely ambiguous. That is, "10" may relate to many subject-matters. However, when associated with context objects that define certain types of businesses, then "10" is inferred (using associative logic such as that found in SCBASPAGL 148 shown in FIG. 1) to relate to sales goals (in millions of dollars) when associated with meeting context object 410x, to a particular clothing size when associated with meeting context object 410y, and to net revenue (in millions of dollars) when associated with context object 410z. That is, the data "10" is so vague/meaningless without the associated context object that the data does not even identify the units that the term describes, much less the context of these units.

Figure 5:
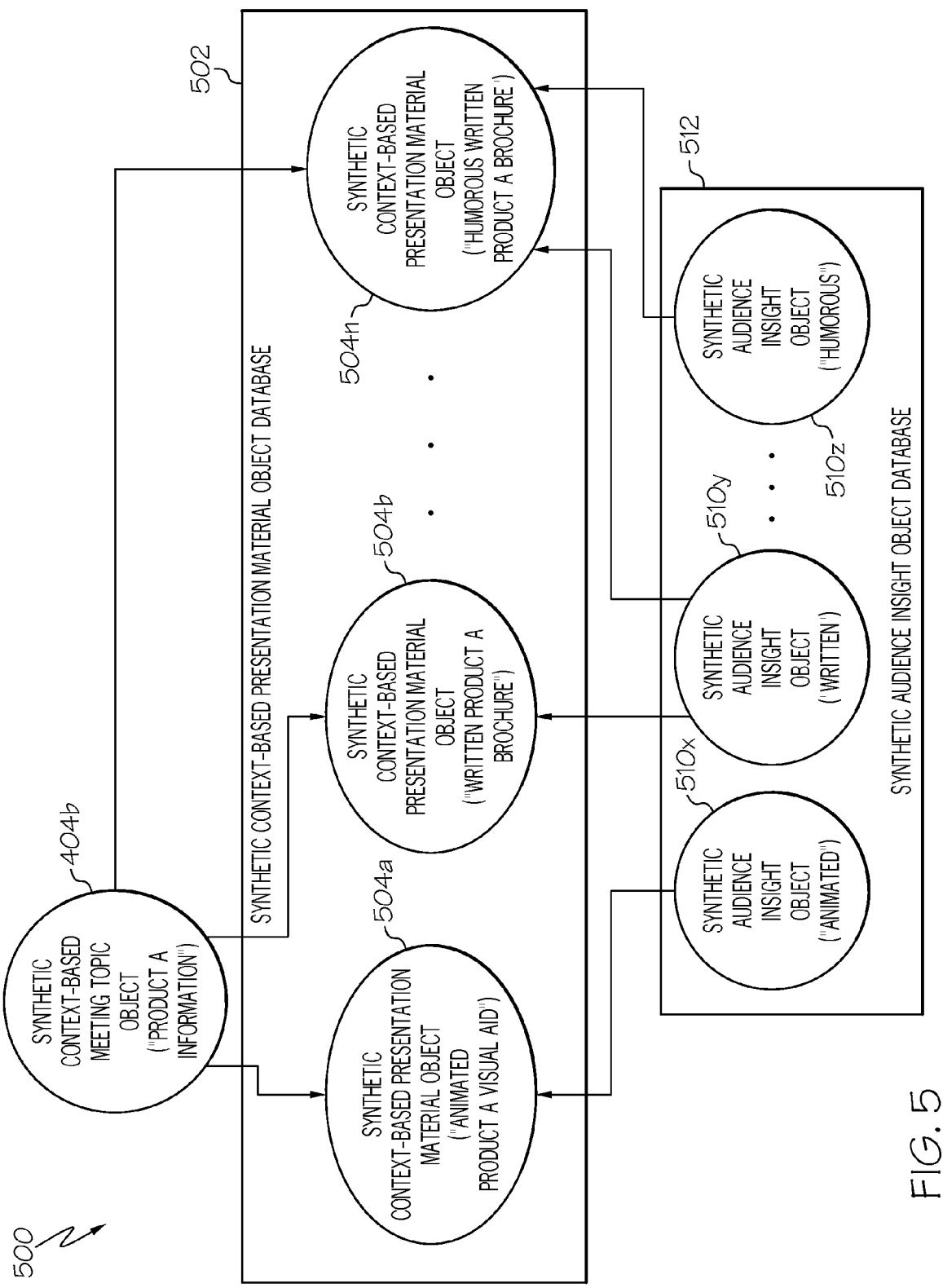
FIG. 5 illustrates a process for generating synthetic context-based presentation material objects.

With reference now to FIG. 5, a process for generating synthetic context-based presentation material objects from a particular synthetic context-based meeting topic object and one or more synthetic audience insight objects if presented. For example, consider the synthetic context-based meeting topic object 404b that was generated in FIG. 4. While the topic context of the meeting has how been established (i.e., the topic of the meeting has been defined), the format (style/content/format/etc.) of presentation materials to be used in this type of meeting (and/or a specific meeting) has not yet been defined. This definition is generated by synthetic audience insight objects 510x-510z, where "z" is an integer. The context described within synthetic audience insight objects 510x-510z is derived from previous commercial interactions with expected audience participants to a particular meeting (or type of meeting). A previous commercial interaction is any commercial exchange, such as, but not limited to, purchases, contract negotiations, corporate social events, sales conventions/promotions, etc.

For example, assume that a proposed meeting is for the purpose of presenting product information about "Product A" to an audience of current and/or prospective customers. When these current and/or prospective customers have been engaged in previous commercial interactions (e.g., sales presentations, interactions as sales booths at a product fair, contract negotiations, corporate entertainment functions, etc.), they have demonstrated a preference for particular types of sales approaches. Some may prefer product information to be in the form of an animated video (as represented by synthetic audience insight object 510x), others may prefer simple written handouts (as represented by synthetic audience insight object 510y), while others may prefer humorous presentations (such as humorous posters, as represented by synthetic audience insight object 510z). In order to determine what type of presentation material is appropriate for a particular topic and a particular audience (or audience type), a synthetic context-based presentation material object (i.e., one or more of synthetic context-based presentation material objects 504a-504n) is generated. Synthetic context-based presentation material objects 504a-504n represent synthetic (i.e., archetypal) models of presentation materials that are appropriate for a particular topic/audience. Such synthetic context-based presentation material objects are then used to retrieve and/or consolidate appropriate presentation materials for meeting with a particular audience on a particular topic, as descried below in FIG. 6. Note that a moderator/organizer of the proposed meeting may or may not be aware of the existence of such presentation materials. Nonetheless, the present invention retrieves and/or assimilates such appropriate presentation materials for use by the moderator.

Figure 6:
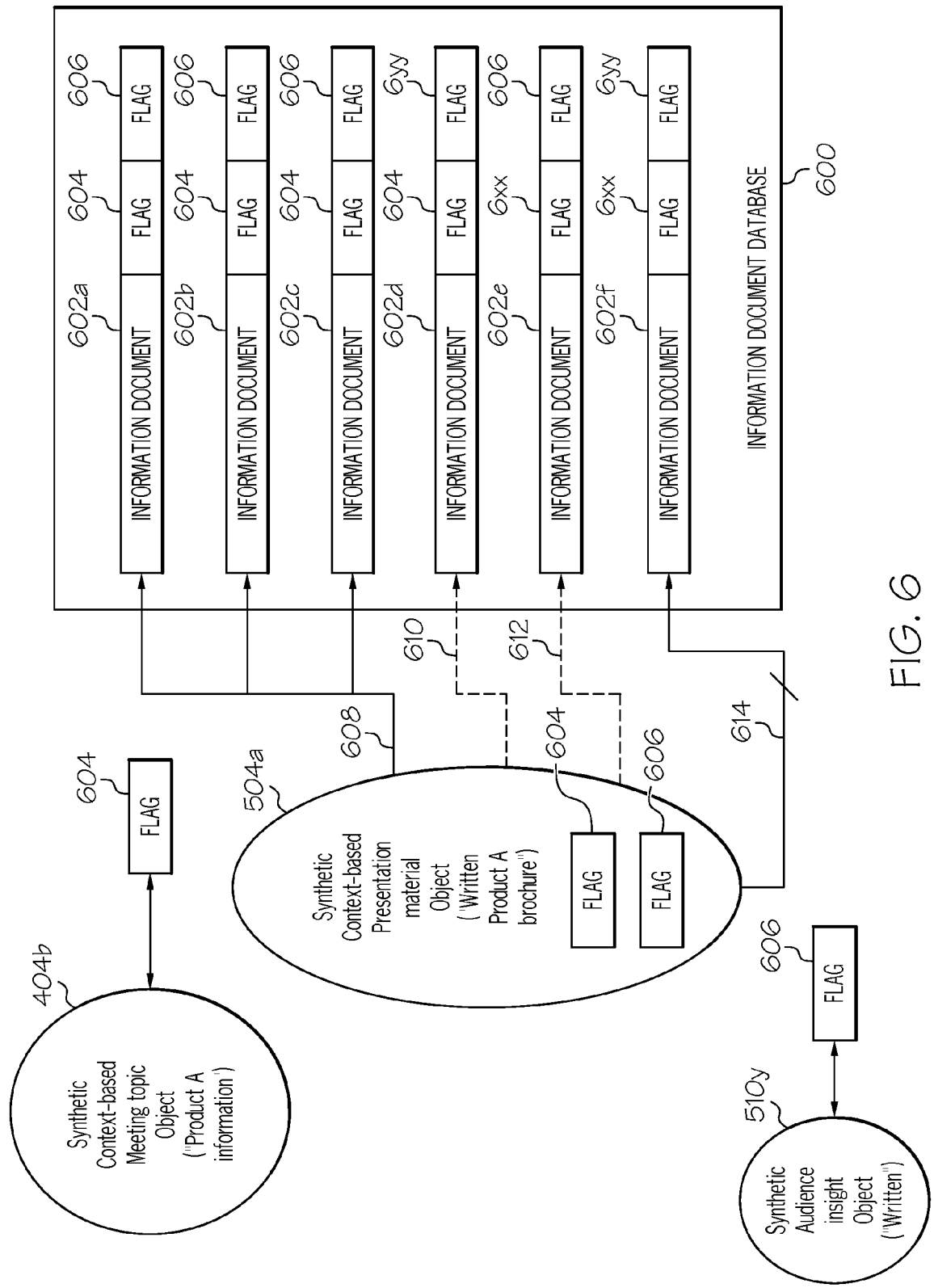
FIG. 6 depicts a process for retrieving information documents that are applicable to demonstrative aids used for a specific meeting topic and audience type.

FIG. 6 depicts an exemplary process for retrieving appropriate materials to be used as presentation aids in a proposed meeting, to a specific audience, about a particular topic. As depicted in FIG. 6, consider information document database 600, which contains information documents 602a-602f, where "f" is an integer. Each of the information documents 602a-602f is a document data file, which may be text, audio, video, animation, or any other type/format of document data file. That is, a "document" may be written, visual, aural, etc.

Information document database 600 is stored in and/or managed by a data storage system, such as data storage system 152 shown in FIG. 1. As depicted in FIG. 6, exemplary synthetic context-based meeting topic object 404b (described in FIG. 4) has been mapped to a flag 604, which is an indicator of a logical relationship (e.g., a pointer to) synthetic context-based meeting topic object 404b (described above in FIG. 4). Likewise, synthetic audience insight object 510y (described in FIG. 5) has been mapped to a flag 606. Flag 604 and flag 606 are included in synthetic context-based presentation material object 504a (described/introduced in FIG. 5).

Note that each of the information documents 602a-602f has appended thereon flags that describe a particular synthetic context-based meeting topic object and a particular synthetic audience insight object. For example, information documents 602a-602c have appended thereon flag 604 and flag 606, indicating that they are "written" (see flag 606) materials that provide "Product A" information (see flag 604). As such, a pointer 608 will retrieve these documents as appropriate presentation materials for the topic/audience that led to the generation of synthetic context-based presentation material object 504a, as described above.

Information document 602d has appended thereon flag 604, indicating that it is appropriate for the topic (presenting information about Product A), but flag 6yy is different from flag 606, and thus information document 602d is not a written (i.e., text) document. Nonetheless, pointer 610 may still point to and retrieve information document 602d for use with this meeting.

Information document 602e has appended thereon flag 606, indicating that it is in writing, but flag 6xx is different from flag 604, and thus information document 602e is not about the topic of the meeting. Thus, while pointer 612 may point to and retrieve information document 602e for use with the proposed meeting, it is unlikely.

Information document 602f has appended thereon flags 6xx and 6yy, indicating that information document 1) is not related to the topic of the proposed meeting and 2) is not in writing. Thus, pointer 614 is prevented from pointing to and/or retrieving information document 602f for use with the proposed meeting.

In one embodiment, once the appropriate information documents 602 are retrieved, they are then consolidated into an appropriate set of presentation materials for the topic of presenting information about Product A to an audience that prefers materials that are in writing. Note that if the synthetic context-based presentation material object 504 was generated from disparate types of synthetic audience insight objects 510, then corresponding disparate types of information documents 602 are retrieved. For example, assume that information document 602a is a written document (i.e., a "hand out"), while information document 602d is a graphics poster. If the synthetic audience insight objects 510 that generated the synthetic context-based presentation material object 504 included both written and graphic preferences, then both written and graphic information documents 602 will be retrieved.

As described herein, the present invention provides a method, system, and/or computer program product for generating presentation material for a proposed meeting. In one embodiment, the method comprises receiving, by one or more processors, a topic of a proposed meeting. The processor(s) identify synthetic insights of members of an expected meeting audience at the proposed meeting, wherein the synthetic insights describe a preferred style of communication as indicated by the members of the expected meeting audience during a previous commercial interaction. The processor(s) match information documents from a document database to the topic of the proposed meeting and the synthetic insights of the expected meeting audience, wherein said matching retrieves relevant information documents for the proposed meeting. The processor(s) generate presentation material for the proposed meeting from the relevant information documents that match the topic of the proposed meeting and the synthetic insights of the expected meeting audience.

As described herein, in one embodiment, the method further comprises the processor(s) consolidating the relevant information documents into a single meeting information document for the proposed meeting.

A described herein, in one embodiment, the method further comprises the processor(s) generating the topic of the proposed meeting by generating a synthetic context-based meeting topic object, wherein the synthetic context-based meeting topic object describes the topic of the proposed meeting, and wherein the synthetic context-based meeting topic object is generated by: receiving a data stream that contains non-contextual meeting topic data objects, wherein each of the non-contextual meeting topic data objects ambiguously relates to multiple subject-matters for meeting topics; and associating one of the non-contextual meeting topic data objects with a meeting context object to define the synthetic context-based meeting topic object, wherein the meeting context object provides a context that identifies a specific subject-matter, from the multiple subject-matters, of said one of the non-contextual meeting topic data objects.

As described herein, in one embodiment, the method further comprises the processor(s) generating the synthetic insights of members of the expected meeting audience at the proposed meeting by generating a synthetic audience insight object, wherein the synthetic audience insight object describes the preferred style of communication for the members of the expected meeting audience for the topic of the proposed meeting, and wherein the synthetic audience insight object is generated by: receiving a data stream that contains the synthetic context-based meeting topic object; and associating the synthetic context-based meeting topic object with one or more customer-insight objects, wherein each customer-insight object describes one or more preferred styles of communication for the members of the expected meeting audience.

As described herein, in one embodiment, the method further comprises the processor(s) generating the presentation material for the proposed meeting by: receiving a data stream that contains the synthetic context-based meeting topic object; and associating the synthetic context-based meeting topic object with the synthetic audience insight object to create a synthetic context-based presentation material object, wherein the synthetic context-based presentation material object defines the presentation material.

In one embodiment, the synthetic audience insight objects are based on a record of the previous commercial interactions (e.g., meetings) with the expected meeting audience. In one embodiment, this record, which is retrieved by the processor(s), includes data inputs from members of the expected meeting audience indicating their preferred style of communication. These data inputs may be from a survey presented before or after previous meetings, verbal comments made during previous meetings, etc. In one embodiment, the preferred style of communication is determined by the responsiveness to particular styles of communication in the past. For example, assume that an audience was presented with only written handouts about a product at one meeting, but the same audience was shown a video clip about a similar product at another meeting. If this same audience (who will also be attending the proposed meeting described herein) bought twice as much product at the second meeting than at the first meeting, then a presumption is made that this particular audience is more receptive to (i.e., has a preference for) video clips over written handouts.

In one embodiment, one exemplary previous commercial interaction described herein is a previous contract negotiation session with one or more members of the expected meeting audience. In one embodiment, an exemplary previous commercial interaction described herein is a previous meeting with the members of the expected meeting audience.

In one embodiment, proper generation of a particular synthetic context-based presentation material object is probabilistic. That is, in one embodiment, processor(s) determine a probability that a particular synthetic audience insight object correctly defines a synthetic context-based presentation material object according to a Bayesian probability formula of:

$$P(A \mid B) = \frac{P(B \mid A)P(A)}{P(B)}$$

where:
P(A|B) is the probability that the particular synthetic audience insight object correctly defines the synthetic context-based presentation material object (A) given that (I) a specific synthetic context-based meeting topic object is applied to the synthetic context-based presentation material object (B);
P(B|A) is the probability that the specific synthetic context-based meeting topic object is applied to the synthetic context-based presentation material object (B) given that (I) the particular synthetic audience insight object correctly defines the synthetic context-based presentation material object (A);
P(A) is the probability that the particular synthetic audience insight object correctly defines the synthetic context-based presentation material object regardless of any other information; and
P(B) is the probability that the specific synthetic context-based meeting topic object is applied to the synthetic context-based presentation material object regardless of any other information.

For example, assume that a specific synthetic context-based meeting topic object is applied to the synthetic context-based presentation material object (B), given that (I) the particular synthetic audience insight object correctly defines the synthetic context-based presentation material object 90% of the time. Thus, P(B|A)=9/10=0.90. Assume also that the probability that the particular synthetic audience insight object correctly defines the synthetic context-based presentation material object regardless of any other information is 20% (P(A)=0.20), and that the probability that the specific synthetic context-based meeting topic object is applied to the synthetic context-based presentation material object regardless of any other information is 25% (P(B)=0.25). The probability that any particular synthetic audience insight object correctly defines the synthetic context-based presentation material object (A) given that (|) a specific synthetic context-based meeting topic object is applied to the synthetic context-based presentation material object (B) is thus 72%:

$$P(A \mid B) = \frac{.90 * .20}{.25} = .72$$

However, if the probability of another specific synthetic context-based meeting topic object being applied to the synthetic context-based presentation material object (B), given that (|) another particular synthetic audience insight object correctly defines the synthetic context-based presentation material object, is still 90%, but the probability that this other particular synthetic audience insight object correctly defines the synthetic context-based presentation material object regardless of any other information is now 25% (P(A)=0.25), and that the probability that the specific synthetic context-based meeting topic object is applied to the other synthetic context-based presentation material object regardless of any other information is now 23% (P(B)=0.23), then the probability that this other particular synthetic audience insight object correctly defines the synthetic context-based presentation material object (A) given that (|) the other synthetic context-based meeting topic object is applied to the synthetic context-based presentation material object (B) is now 98%:

$$P(A \mid B) = \frac{.90 * .25}{.23} = .98$$

Thus, in the second scenario, the other synthetic audience insight object and/or other synthetic context-based meeting topic object is deemed to be much more trustworthy than those that resulted in the 72% likelihood of being appropriate.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of generating presentation material for a proposed meeting, the method comprising:
    receiving, by one or more processors, a topic of a proposed meeting;
    identifying, by one or more processors, synthetic insights of members of an expected meeting audience at the proposed meeting, wherein the synthetic insights describe a preferred style of communication as indicated by the members of the expected meeting audience during a previous commercial interaction, wherein the preferred style of communication is related to a format of presentation materials, wherein the format of presentation materials is from a group of formats consisting of a written format, a visual format, and a musical format, wherein the preferred style of communication is further related to a tone of the presentation materials, wherein the tone of the presentation material is from a group consisting of a humorous tone, an anecdotal tone, a spontaneous tone, and a polished tone, wherein the preferred style of communication is further related to a content of the presentation materials wherein the content of the presentation materials is from a group consisting of math equations, use cases, and background technical information related to the topic of the proposed meeting, wherein the preferred style of communication is further related to a length of the presentation materials;

setting, by one or more processors, a first flag and a second flag on multiple information documents, wherein the first flag identifies the topic of the proposed meeting, wherein the second flag identifies the preferred style of communication;

matching, by one or more processors, the multiple information documents from a document database to the topic of the proposed meeting and the synthetic insights of the expected meeting audience, wherein said matching retrieves relevant information documents for the proposed meeting by retrieving information documents that have the first flag and the second flag;

generating, by one or more processors, presentation material for the proposed meeting from the relevant information documents that match the topic of the proposed meeting and the synthetic insights of the expected meeting audience, wherein the relevant information documents that match the topic of the proposed meeting and the synthetic insights of the expected meeting audience have the first flag and the second flag;

consolidating, by one or more processors, the relevant information documents into a single meeting information document for the proposed meeting;

generating, by one or more processors, the topic of the proposed meeting by generating a synthetic context-based meeting topic object, wherein the synthetic context-based meeting topic object describes the topic of the proposed meeting and wherein the synthetic context-based meeting topic object is generated by:
  receiving, by one or more processors, a data stream that contains non-contextual meeting topic data objects, wherein each of the non-contextual meeting topic data objects ambiguously relates to multiple subject-matters for meeting topics and wherein the non-contextual meeting topic data objects have no meaning without a context object; and
  associating, by one or more processors, one of the non-contextual meeting topic data objects with a meeting context object to define the synthetic context-based meeting topic object, wherein the meeting context object provides a context that identifies a specific subject-matter, from the multiple subject-matters, of said one of the non-contextual meeting topic data objects;

generating, by one or more processors, the synthetic insights of members of the expected meeting audience at the proposed meeting by generating a synthetic audience insight object, wherein the synthetic audience insight object describes the preferred style of communication for the members of the expected meeting audience for the topic of the proposed meeting, and wherein the synthetic audience insight object is generated by:
  receiving by one or more processors a data stream that contains the synthetic context-based meeting topic object; and
  associating, by one or more processors, the synthetic context-based meeting topic object with one or more customer-insight objects, wherein each customer-insight object describes one or more preferred styles of communication for the members of the expected meeting audience;

generating, by one or more processors, the presentation material for the proposed meeting by:
  receiving, by one or more processors, a data stream that contains the synthetic context-based meeting topic object; and
  associating, by one or more processors, the synthetic context-based meeting topic object with the synthetic audience insight object to create a synthetic context-based presentation material object, wherein the synthetic context-based presentation material object defines the presentation material and wherein the synthetic context-based material object includes the first flag and the second flag;

determining, by one or more processors, a probability that a particular synthetic audience insight object correctly defines a synthetic context-based presentation material object according to a Bayesian probability formula of:

$$P(A \mid B) = \frac{P(B \mid A)P(A)}{P(B)}$$

where:
P(A|B) is the probability that the articular synthetic audience insight object correctly defines the synthetic context-based presentation material object (A) given that (|) a specific synthetic context-based meeting topic object is applied to the synthetic context-based presentation material object (B);
P(B|A) is the probability that the specific synthetic context-based meeting topic object is applied to the synthetic context-based presentation material object (B) given that (|) the particular synthetic audience insight object correctly defines the synthetic context-based presentation material object (A);
P(A) is the probability that the particular synthetic audience insight object correctly defines the synthetic context-based presentation material object regardless of any other information; and
P(B) is the probability that the specific synthetic context-based meeting topic object is applied to the synthetic context-based presentation material object regardless of any other information; and
  retrieving, by one or more processors, a record of the previous commercial interaction, wherein the record of the previous commercial interaction comprises data inputs from members of the expected meeting audience indicating their preferred style of communication.

2. The method of claim 1, wherein the previous commercial interaction is a previous contract negotiation session with one or more members of the expected meeting audience.

3. The method of claim 1, wherein the previous commercial interaction is a previous meeting with one or more members of the expected meeting audience.

4. A computer program product for generating presentation material for a proposed meeting, the computer program product comprising a non-transitory computer readable storage medium having program code embodied therewith, the program code readable and executable by one or more processors to perform a method comprising:
  receiving a topic of a proposed meeting;
  identifying synthetic insights of members of an expected meeting audience at the proposed meeting, wherein the synthetic insights describe a preferred style of communication as indicated by the members of the expected meeting audience during a previous commercial interaction, wherein the preferred style of communication is related to a format of presentation materials, wherein the format of presentation materials is from a group of formats consisting of a written format, a visual format, and a musical format, wherein the preferred style of communication is further related to a tone of the presentation materials, wherein the tone of the presentation material is from a group consisting of a humorous tone an anecdotal tone a spontaneous tone, and a polished tone, wherein the preferred style of communication is further related to a content of the presentation materials, wherein the content of the presentation materials is from a group consisting of math equations, use cases, and background technical information related to the topic of the proposed meeting, wherein the preferred style of communication is further related to a length of the presentation materials;

setting a first flag and a second flag on multiple information documents wherein the first flag identifies the topic of the proposed meeting, wherein the second flag identifies the preferred style of communication;

matching the multiple information documents from a document database to the topic of the proposed meeting and the synthetic insights of the expected meeting audience, wherein said matching retrieves relevant information documents for the proposed meeting by retrieving information documents that are affixed to the first flag and the second flag;

generating presentation material for the proposed meeting from the relevant information documents that match the topic of the proposed meeting and the synthetic insights of the expected meeting audience, wherein the relevant information documents that match the topic of the proposed meeting and the synthetic insights of the expected meeting audience have the first flag and the second flag;

consolidating the relevant information documents into a single meeting information document for the proposed meeting;

generating the topic of the proposed meeting by generating a synthetic context-based meeting topic object, wherein the synthetic context-based meeting topic object describes the topic of the proposed meeting, and wherein the synthetic context-based meeting topic object is generated by:

receiving a data stream that contains non-contextual meeting topic data objects, wherein each of the non-contextual meeting topic data objects ambiguously relates to multiple subject-matters for meeting topics and wherein the non-contextual meeting topic data objects have no meaning without a context object; and associating one of the non-contextual meeting topic data objects with a meeting context object to define the synthetic context-based meeting topic object wherein the meeting context object provides a context that identifies a specific subject-matter, from the multiple subject-matters, of said one of the non-contextual meeting topic data objects;

generating the synthetic insights of members of the expected meeting audience at the proposed meeting by generating a synthetic audience insight object, wherein the synthetic audience insight object describes the preferred style of communication for the members of the expected meeting audience for the topic of the proposed meeting, and wherein the synthetic audience insight object is generated by:

receiving a data stream that contains the synthetic context-based meeting topic object; and associating the synthetic context-based meeting topic object with one or more customer-insight objects, wherein each customer-insight object describes one or more preferred styles of communication for the members of the expected meeting audience;

generating the presentation material for the proposed meeting by:

receiving a data stream that contains the synthetic context-based meeting topic object; and associating the synthetic context-based meeting topic object with the synthetic audience insight object to create a synthetic context-based presentation material object, wherein the synthetic context-based presentation material object defines the presentation material, and wherein the synthetic context-based material object includes the first flag and the second flag;

determining a probability that a particular synthetic audience insight object correctly defines a synthetic context-based presentation material object according to a Bayesian probability formula of:

$$P(A \mid B) = \frac{P(B \mid A)P(A)}{P(B)}$$

where:

$P(A|B)$ is the probability that the particular synthetic audience insight object correctly defines the synthetic context-based presentation material object (A) given that (|) a specific synthetic context-based meeting topic object is applied to the synthetic context-based presentation material object (B);

$P(B|A)$ is the probability that the specific synthetic context-based meeting topic object is applied to the synthetic context-based presentation material object (B) given that (|) the particular synthetic audience insight object correctly defines the synthetic context-based presentation material object (A);

$P(A)$ is the probability that the particular synthetic audience insight object correctly defines the synthetic context-based presentation material object regardless of any other information; and $P(B)$ is the probability that the specific synthetic context-based meeting topic object is applied to the synthetic context-based presentation material object regardless of any other information; and retrieving a record of the previous commercial interaction, wherein the record of the previous commercial interaction comprises data inputs from members of the expected meeting audience indicating their preferred style of communication.

5. A computer system comprising:

a processor, a computer readable memory, and a computer readable storage medium;

first program instructions to receive a topic of a proposed meeting;

second program instructions to identify synthetic insights of members of an expected meeting audience at the proposed meeting, wherein the synthetic insights describe a preferred style of communication as indicated by the members of the expected meeting audience during a previous commercial interaction, wherein the preferred style of communication is related to a format of presentation materials, wherein the format of presentation materials is from a group of formats consisting of a written format, a visual format, and a musical format, wherein the preferred style of communication is further related to a tone of the presentation materials, wherein the tone of the presentation material is from a group consisting of a humorous tone, an anecdotal tone, a spontaneous tone, and a polished tone, wherein the preferred style of communication is further related to a content of the presentation materials wherein the content of the presentation materials is from a group consisting of math equations, use cases, and background technical information related to the topic of the proposed meeting, wherein the preferred style of communication is further related to a length of the presentation materials;

third program instructions to set a first flag and a second flag on multiple information documents, wherein the first flag identifies the topic of the proposed meeting, wherein the second flag identifies the preferred style of communication;

fourth program instructions to match the multiple information documents from a document database to the topic of the proposed meeting and the synthetic insights of the expected meeting audience wherein said matching retrieves relevant information documents for the proposed meeting by retrieving information documents that are affixed to the first flag and the second flag;

fifth program instructions to generate presentation material for the proposed meeting from the relevant information documents that match the topic of the proposed meeting and the synthetic insights of the expected meeting audience wherein the relevant information documents that match the topic of the proposed meeting and the synthetic insights of the expected meeting audience have the first flag and the second flag;

sixth program instructions to consolidate the relevant information documents into a single meeting information document for the proposed meeting;

seventh program instructions to generate the topic of the proposed meeting by generating a synthetic context-based meeting topic object, wherein the synthetic context-based meeting topic object describes the topic of the proposed meeting and wherein the synthetic context-based meeting topic generated by:
  receiving a data stream that contains non-contextual meeting topic data objects, wherein each of the non-contextual meeting topic data objects ambiguously relates to multiple subject-matters for meeting topics and wherein the non-contextual meeting topic data objects have no meaning without a context object; and
  associating one of the non-contextual meeting topic data objects with a meeting context object to define the synthetic context-based meeting topic object wherein the meeting context object provides a context that identifies a specific subject-matter from the multiple subject-matters, of said one of the non-contextual meeting topic data objects;

eighth program instructions to generate the synthetic insights of members of the expected meeting audience at the proposed meeting by generating a synthetic audience insight object, wherein the synthetic audience insight object describes the preferred style of communication for the members of the expected meeting audience for the topic of the proposed meeting, and wherein the synthetic audience insight object is generated by:
  receiving a data stream that contains the synthetic context-based meeting topic object; and
  associating the synthetic context-based meeting topic object with one or more customer-insight objects, wherein each customer-insight object describes one or more preferred styles of communication for the members of the expected meeting audience, ninth program instructions to generate the presentation material for the proposed meeting by:
  receiving a data stream that contains the synthetic context-based meeting topic object; and
  associating the synthetic context-based meeting topic object with the synthetic audience insight object to create a synthetic context-based presentation material object, wherein the synthetic context-based presentation material object defines the presentation material, and wherein the synthetic context-based material object includes the first flag and the second flag; and ninth program instructions to determine a probability that a particular synthetic audience insight object correctly defines a synthetic context-based presentation material object according to a Bayesian probability formula of:

$$P(A \mid B) = \frac{P(B \mid A)P(A)}{P(B)}$$

where:
P(A|B) is the probability that the particular synthetic audience insight object correctly defines the synthetic context-based presentation material object (A) given that (|) a specific synthetic context-based meeting topic object is applied to the synthetic context-based presentation material object (B);
P(B|A) is the probability that the specific synthetic context-based meeting topic object is applied to the synthetic context-based presentation material object (B) given that (|) the particular synthetic audience insight object correctly defines the synthetic context-based presentation material object (A);
P(A) is the probability that the particular synthetic audience insight object correctly defines the synthetic context-based presentation material object regardless of any other information; and
P(B) is the probability that the specific synthetic context-based meeting topic object is applied to the synthetic context-based presentation material object regardless of any other information; and tenth program instructions to retrieve a record of the previous commercial interaction, wherein the record of the previous commercial interaction comprises data inputs from members of the expected meeting audience indicating their preferred style of communication; and wherein the first, second, third, fourth, fifth, sixth, seventh, eighth, ninth, and tenth program instructions are stored on the computer readable storage medium for execution by the processor via the computer readable memory.

* * * * *